(12) United States Patent
Schwery et al.

(10) Patent No.: US 9,473,000 B2
(45) Date of Patent: Oct. 18, 2016

(54) ROTOR FOR AN ELECTRIC MACHINE AND METHOD FOR RETROFIT

(71) Applicant: ALSTOM Renewable Technologies, Grenoble (FR)

(72) Inventors: Alexander Schwery, Kuettigen (CH); Stefan Baumeister, Kuessaberg (DE)

(73) Assignee: ALSTOM Renewable Technologies, Grenoble (FR)

( * ) Notice: Subject to any disclaimer, the term of this patent is extended or adjusted under 35 U.S.C. 154(b) by 612 days.

(21) Appl. No.: 13/910,244

(22) Filed: Jun. 5, 2013

(65) Prior Publication Data

US 2013/0328422 A1 Dec. 12, 2013

(30) Foreign Application Priority Data

Jun. 6, 2012 (EP) ..................................... 12171021

(51) Int. Cl.
| | |
|---|---|
| *H02K 9/02* | (2006.01) |
| *H02K 1/32* | (2006.01) |
| *H02K 15/00* | (2006.01) |
| *H02K 15/02* | (2006.01) |

(52) U.S. Cl.
CPC ...... *H02K 9/02* (2013.01); *H02K 1/32* (2013.01); *H02K 15/0006* (2013.01); *H02K 15/02* (2013.01); *H02K 2213/09* (2013.01); *Y10T 29/49012* (2015.01)

(58) Field of Classification Search
CPC .................................. H02K 9/02; H02K 1/32
See application file for complete search history.

(56) References Cited

U.S. PATENT DOCUMENTS

| 4,641,051 A * | 2/1987 | Auinger .................. H02K 1/32 310/61 |
| 4,859,887 A * | 8/1989 | Carlsson .................. H02K 9/18 277/644 |
| 2012/0068561 A1* | 3/2012 | Schwery .................. H02K 9/12 310/53 |

FOREIGN PATENT DOCUMENTS

| CN | 101253670 A | 8/2008 |
| CN | 102138272 A | 7/2011 |
| CN | 102412663 A | 4/2012 |
| DE | 19731313 A1 | 9/1998 |
| EP | 0639883 A1 | 2/1995 |
| EP | 1168572 A2 | 1/2002 |
| JP | 56-83232 | 7/1981 |
| JP | 61-192657 | 11/1986 |
| JP | 62-61142 | 4/1987 |
| JP | 62-239838 | 10/1987 |
| JP | 1-138947 | 5/1989 |
| JP | 3-66541 | 6/1991 |
| JP | 2007228669 | 9/2007 |
| JP | 2009290979 | 12/2009 |
| JP | 2010-104202 A | 5/2010 |
| JP | 201110489 A | 1/2011 |
| RU | 2041360 C1 | 8/1995 |
| RU | 2233533 C2 | 7/2004 |
| RU | 105539 U1 | 6/2011 |
| SU | 645232 A1 | 1/1979 |

* cited by examiner

*Primary Examiner* — Dang Le
(74) *Attorney, Agent, or Firm* — Dority & Manning, P.A.

(57) ABSTRACT

The rotor for an electric machine comprises a shaft, a spider on the shaft, a laminated drum on the spider. The spider has a plurality of apart elements defining ducts between each other. The laminated drum has a plurality of cooling channels connected to the ducts. The rotor also has throttle elements associated to at least one duct and/or cooling channel.

12 Claims, 3 Drawing Sheets

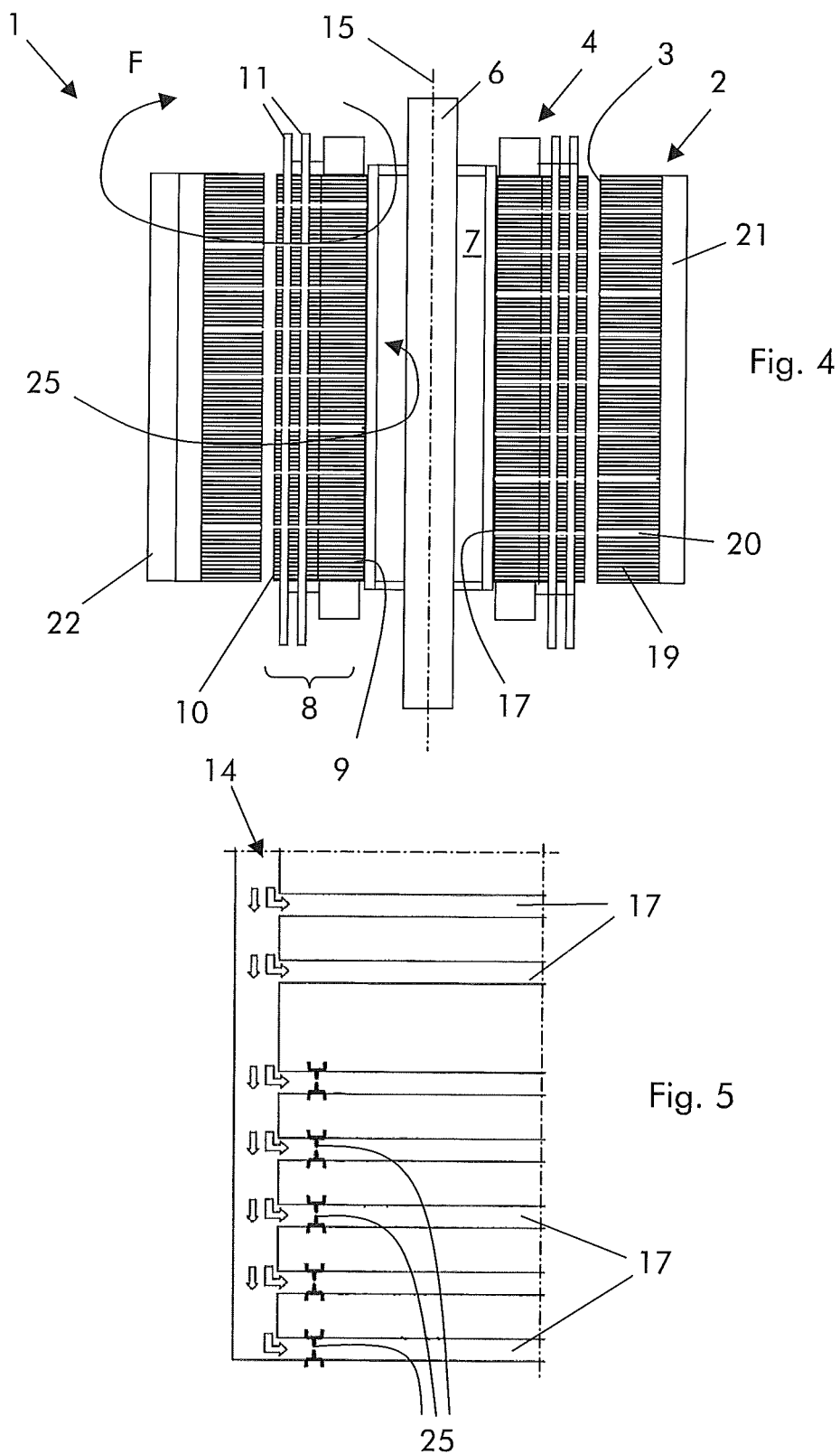

ROTOR FOR AN ELECTRIC MACHINE AND METHOD FOR RETROFIT

TECHNICAL FIELD

The present disclosure relates to a rotor for an electric machine and a method for retrofit the same.

The electric machine can be a rotating electric machine such as a synchronous generator or an asynchronous generator (preferably to be connected to a hydro turbine) or a synchronous or asynchronous electric motor or also other types of electric machines. In addition the electric machine can have a rotor with salient poles or not.

BACKGROUND

Electric machines such as hydro generators have a rotor connected to a hydro turbine and a stator. Often the rotor and stator are assembled with a vertical axis.

The rotor comprises a shaft, a spider on the shaft and a laminated drum on the spider.

The spider defines a plurality of axial ducts and the laminated drum has a plurality of radial cooling channels connected to the ducts, such that during operation a gas (such as air) circulates through the ducts and cooling channels to cool the rotor and stator.

Air circulation causes losses that should be minimized.

In particular, losses depend on:

the total air volume flow circulating through the machine, and the air volume flow distribution within the machine.

In order to reduce the circulation losses, traditionally electric machines are designed in order to optimize air volume circulation; nevertheless when designing the cooling features of such electric machines some uncertainties exist that cannot be calculated in advance.

SUMMARY

An aspect of the disclosure includes providing a rotor for an electric machine and indicating a method for retrofit the rotor by which circulation losses can be reduced.

These and further aspects are attained by providing a rotor and a method in accordance with the accompanying claims.

Advantageously, the rotor and method also permit optimisation of the temperatures.

BRIEF DESCRIPTION OF THE DRAWINGS

Further characteristics and advantages will be more apparent from the description of a preferred but non-exclusive embodiment of the rotor and method, illustrated by way of non-limiting example in the accompanying drawings, in which:

FIG. 4 is a schematic view of an electric machine in a second embodiment,

FIGS. 5 through 8 show particulars of the electric machine of FIG. 1; and

DETAILED DESCRIPTION

Figure 1:
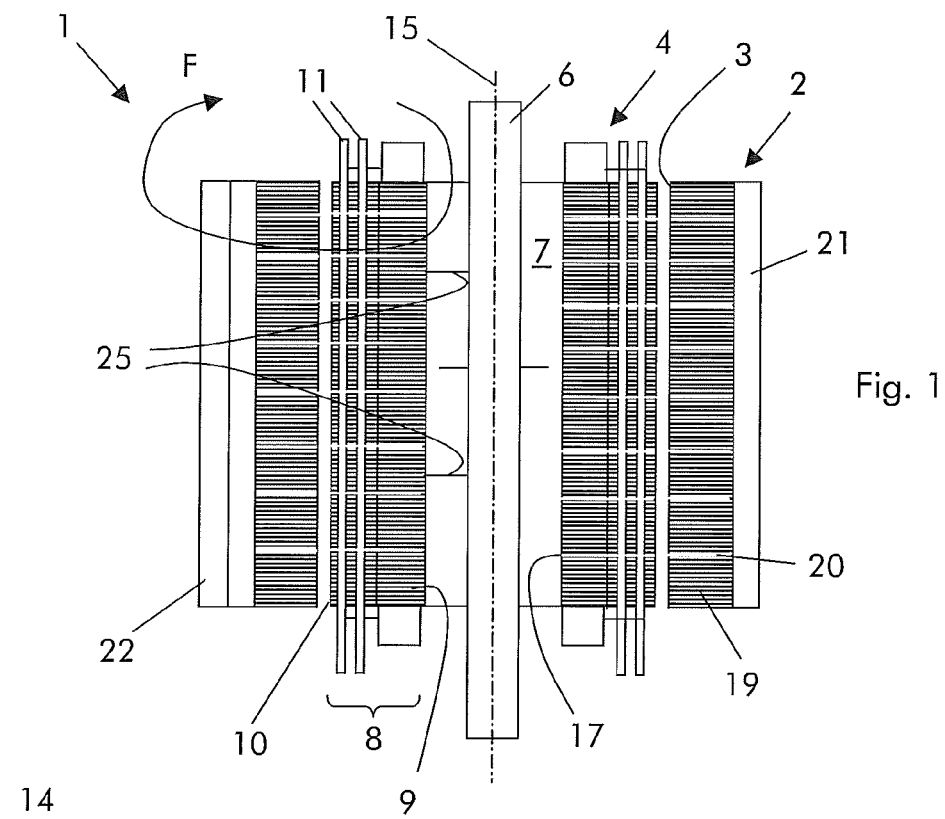
FIG. 1 is a schematic view of an electric machine in a first embodiment.
Figure 2:
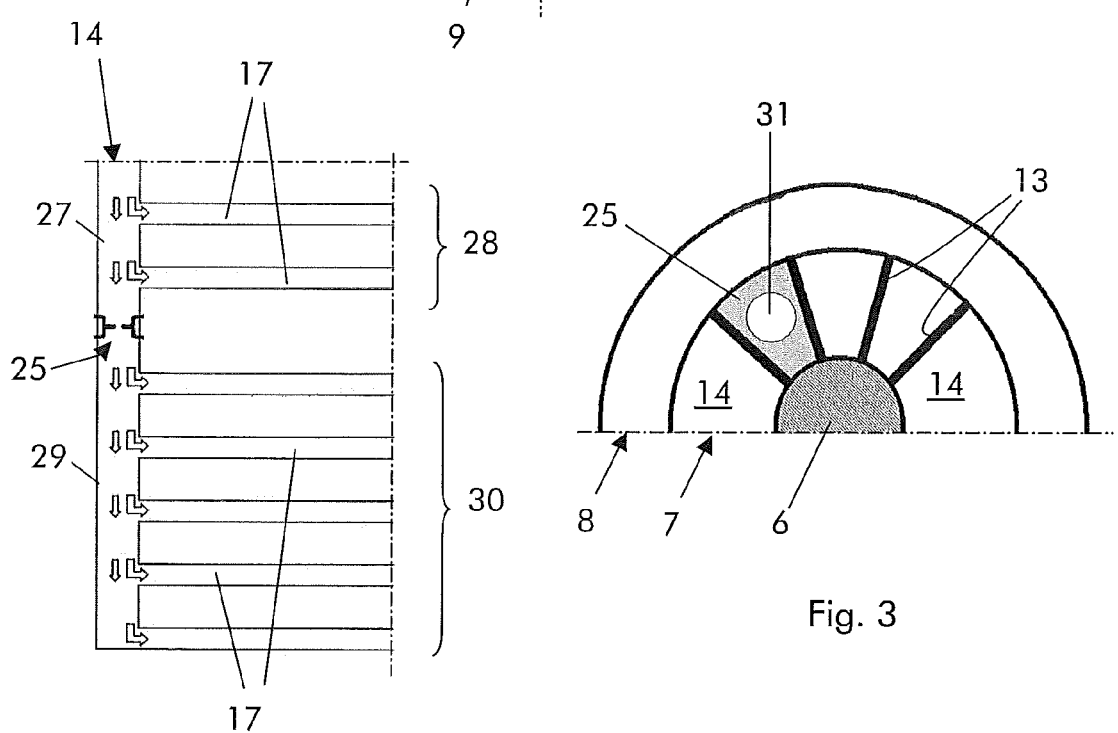
FIGS. 2 and 3 show particulars of the electric machine of FIG. 1.
Figure 3:
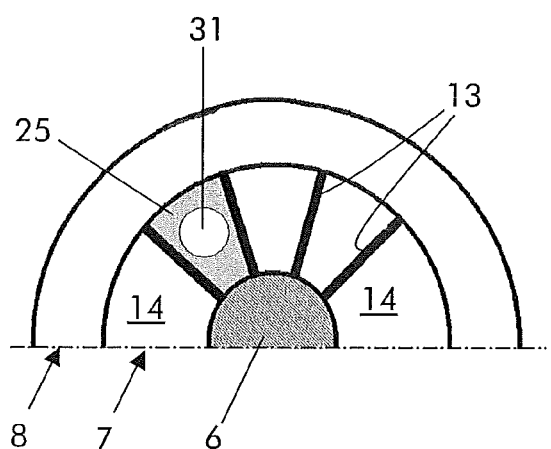
Figures 6, 7, 8:
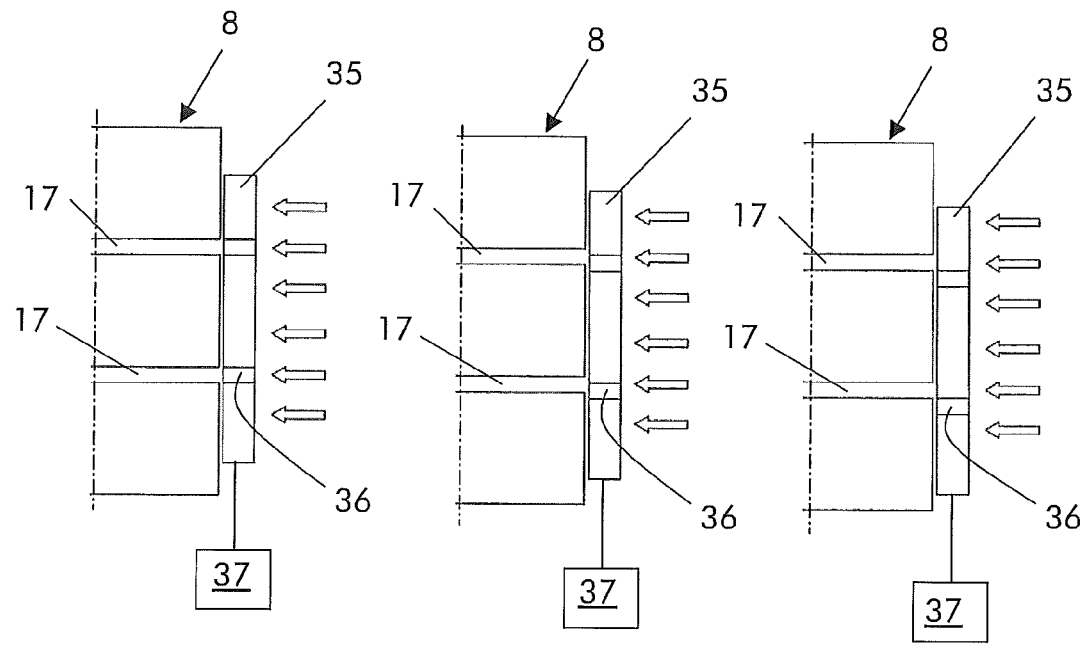
Figure 9:
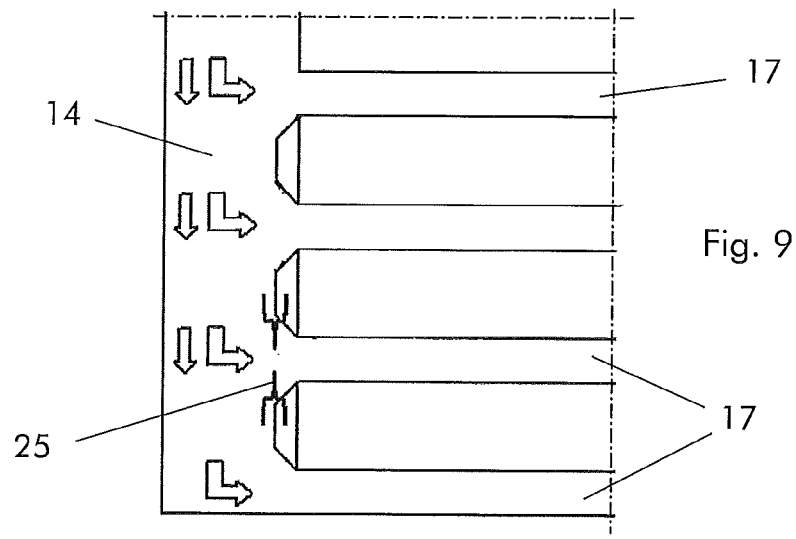
FIG. 9 shows a different embodiment of the electric machine.

With reference to the figures, these show an electric machine 1 such as a hydro generator.

The electric machine 1 has a stator 2 with a stator bore 3 and a rotor 4 housed in the stator bore 3.

The stator 2 and rotor 4 are housed in a casing that contains a gas, such as air (but also other gasses are possible). The gas contained in the casing is circulated through the electric machine 1 for cooling it.

The rotor 4 includes a shaft 6 that supports a spider 7. The spider 7 supports a laminated drum 8 that includes a mechanical part 9 and an electrical part 10 with slots that house conductive bars 11.

The spider 7 has a plurality of apart elements 13, such as radial plates, that define ducts 14 between each other.

Preferably, the ducts 14 extend parallel to a longitudinal rotor axis 15.

The laminated drum 8 has cooling channels 17 that preferably extend radially and perpendicular to the rotor axis 15.

The cooling channels 17 are connected to the ducts 14.

The stator 2 has a laminated core 19 and has cooling channels 20. The laminated core is connected to a support 21 and a cooler 22.

The rotor comprises throttle elements 25 that are associated to one or more ducts 14 and/or one or more cooling channel 17.

The throttle elements 25 allow adjustment of:

the total air volume flow circulating through the electric machine 1, and the air volume flow distribution within the machine, such that circulation losses can be optimised.

For example, the air volume flow can be adjusted such that the air volume flow circulating through the machine (for example rotor and stator) is the air volume flow required for cooling; in other words any air volume flow in excess to the air volume flow required for cooling is prevented from circulating through the electric machine 1.

The throttle elements 25 can be provided within the ducts 14.

In this case the throttle elements preferably define a first zone 27 of the duct 14 connected to a first group 28 of cooling channels 17, and a second zone 29 of the duct 14 connected to a second group 30 of cooling channels 17.

For example the throttle elements 25 can be defined by plates provided in the duct 14, the plate defining a passage 31 for the gas passing through the duct 14.

The passage 31 is preferably defined by a hole in the plate.

Alternatively or in addition, the throttle element in this embodiment can also be any element that can throttle the air volume flow, such as throttle valves electrically, hydraulically or pneumatically controlled.

Alternatively or in addition to the throttle elements that partially close the ducts 14, throttle elements can also be provided at the cooling channels 17.

In this case the throttle elements 25 are preferably housed in the ducts 14 and are connected to the ends of at least some of the cooling channels 17.

For example the throttle elements 25 include one or more walls 35 movable to the laminated drum 8. Each wall 35 can be an elongated plate that is housed in a duct 14 and can slide on the laminated drum 8.

Each wall 35 has apertures 36 and is connected to an activation system that is schematically represented at 37.

The activation system 37 can adjust the position of the wall 35 such that the apertures 36 are aligned with the cooling channels 17 or partially or completely close them.

Alternatively or in addition, the throttle element in this embodiment can also be any element that can throttle the air volume flow, such as throttle valves electrically, hydraulically or pneumatically controlled associated to each cooling channel 17.

The cooling channels 17 can also have the end connected to the ducts 14 that is flared and preferably provided with throttle element 25 at its largest diameter.

In this embodiment, regulation of the throttle elements 25 allows regulation of the pressure loss for entry the cooling channels 17, such that for example with fully open throttle elements 25 a greater flow through the cooling channels 17 is achieved than with partially open throttle elements 25 or even without any air regulation system.

Also in this case, the throttle elements 25 can for example be electrically or pneumatically or hydraulically driven throttle valves. Other types of throttling elements are anyhow possible.

The operation of the electric machine is apparent from that described and illustrated and is substantially the following.

During operation cooling gas such as air enters the ducts 14, passes through the ducts 14 and enters the cooling channels 17, to cool the conductive bars 11 and laminated drum 8. Then the cooling gas passes into the cooling channels 20 of the stator 2 to cool also the stator bars and stator laminated core 19.

Thus the cooling gas enters the cooler 22 to be cooled.

Arrow F indicates the air circulation.

During circulation the throttle elements 25 limit the air volume flow through the machine, such that only the air volume required for cooling is actually circulated. This limits circulation losses.

The present disclosure also refers to a method for retrofitting a rotor for an electric machine.

The method includes providing at least a throttle element 25 associated to at least one duct 14 and/or cooling channel 17.

For example, the rotor 4 is operated before the throttle elements 25 are provided. While the rotor operates (before the throttle elements 25 are provided) air circulation losses and/or temperatures are detected.

Thus the throttle elements 25 are provided on the basis of the detected air circulation losses and/or temperatures (for example to minimize the circulation losses and/or optimize the temperatures).

Naturally the features described may be independently provided from one another.

In practice the materials used and the dimensions can be chosen at will according to requirements and to the state of the art.

What is claimed is:

1. A rotor for an electric machine comprising a shaft, a spider on the shaft, a laminated drum on the spider,
    wherein the spider has a plurality of spaced part elements defining ducts between each other for conducting cooling axially air through the spider,
    wherein the laminated drum has a plurality of radially extending cooling channels connected to the ducts for conducting the cooling air radially form the ducts through the laminated drum,
    further comprising at least one cooling air throttle element configured either within one of the ducts or within one of the cooling channels extending from the duct through the laminated drum.

2. The rotor according to claim 1, wherein the throttle element is provided within the duct.

3. The rotor according to claim 2, wherein the throttle element is located within the duct so as to divide the duct into:
    a first zone of the duct connected to a first group of cooling channels having a first air volume flow therethrough, and channels, and
    a second zone of the duct connected to a second group of cooling channels having a second different air volume flow therethrough.

4. The rotor according to claim 2, wherein the throttle element is a plate provided in the duct, the plate defining a passage for a gas passing through the duct.

5. The rotor according to claim 4, wherein the passage is defined by a hole in the plate.

6. The rotor according to claim 1, wherein the throttle element is configured with an individual cooling channel within the duct to throttle cooling air moving into the cooling channel from the duct.

7. The rotor according to claim 6, wherein the throttle element is housed in duct and is connected to an end of the cooling channel.

8. The rotor according to claim 6, wherein the throttle element includes:
    a wall movable to relative to the laminated drum,
    apertures on in the wall,
    an activation system for the wall.

9. The rotor according to claim 1, wherein the throttle element includes a throttle valve.

10. The rotor according to claim 9, wherein the throttle valve is an electrically, hydraulically or pneumatically controlled throttle valve.

11. A method for retrofitting a rotor for an electric machine, the rotor comprising a shaft, a spider on the shaft, a laminated drum on the spider,
    wherein the spider has a plurality of spaced apart elements defining ducts between each other,
    wherein the laminated drum has a plurality of radially extending cooling channels connected to the ducts,
    the method comprises
    providing a cooling air throttle element either within one of the ducts or within one of the cooling channel extending radially form the duct.

12. The method according to claim 11, further comprising operating the rotor before the throttle element is provided, and
    detecting one or both of air circulation losses and temperatures while operating the rotor,
    wherein the throttle element is provided on the basis of the detected air circulation losses or temperatures.

* * * * *